US00RE35143E

United States Patent [19]

Funkenbusch et al.

[11] E Patent Number: Re. 35,143

[45] Reissued Date of Patent: Jan. 9, 1996

[54] ZIRCONIUM OXIDE FIBERS AND PROCESS FOR THEIR PREPARATION

[75] Inventors: Eric F. Funkenbusch, White Bear Lake; Tai T. Tran, Bloomington, both of Minn.

[73] Assignee: Minnesota Mining and Manufacturing Company, St. Paul, Minn.

[21] Appl. No.: 230,480

[22] Filed: Apr. 20, 1994

Related U.S. Patent Documents

Reissue of:

[64] Patent No.: 4,937,212
Issued: Jun. 26, 1990
Appl. No.: 286,654
Filed: Dec. 19, 1988

[51] Int. Cl.[6] ..... C04B 35/48

[52] U.S. Cl. ..... 501/95; 501/102; 501/103; 264/211.12; 264/211.14; 264/211.17; 264/167

[58] Field of Search ..... 501/95, 102, 103; 264/167.1, 211.12, 211.14, 211.17

[56] References Cited

U.S. PATENT DOCUMENTS

| | | | |
|---|---|---|---|
| 3,180,741 | 4/1965 | Walner et al. | 106/39 |
| 3,322,865 | 5/1967 | Blaze | 264/0.5 |
| 3,385,915 | 5/1968 | Hamling | 264/0.5 |
| 3,529,044 | 9/1970 | Santangelo | 264/29 |
| 3,652,749 | 3/1972 | Sobel et al. | 501/95 |
| 3,846,527 | 11/1974 | Winter et al. | 264/63 |
| 3,860,529 | 1/1975 | Hamling | 252/301 |
| 3,992,498 | 11/1976 | Morton et al. | 264/63 |
| 3,996,145 | 12/1976 | Hepburn | 252/62 |
| 4,071,594 | 1/1978 | Pearson et al. | 264/63 |
| 4,501,818 | 2/1985 | Rossi | 501/1 |
| 4,724,109 | 2/1988 | Yamashita et al. | 264/63 |
| 4,753,904 | 6/1988 | Wolfe | 501/95 |
| 4,772,576 | 9/1988 | Kimura et al. | 501/105 |
| 4,797,378 | 1/1989 | Sowman | 501/95 |

FOREIGN PATENT DOCUMENTS

| | | |
|---|---|---|
| 0218853 | 5/1987 | European Pat. Off. . |
| 0021869 | 2/1985 | Japan . |
| 2007667 | 1/1987 | Japan . |
| 62-7667 | 1/1987 | Japan . |
| 1360197 | 5/1966 | United Kingdom . |
| 1030232 | 7/1974 | United Kingdom . |
| 2204573 | 11/1988 | United Kingdom . |

OTHER PUBLICATIONS

Chemical Abstracts, vol. 104, No. 18, p. 354, 1986, abstract No. 154550g.

Marshall et al., "High–Strength Zirconia Fibers", *J. Am. Ceram. Soc.*, 70[8], C187–88 (1987).

M. E. Khavari et al., "Continuous Spinning of Zirconia Fibers: Relations Between Processing And Strength", *Proceedings of the Materials Research Society: Better Ceramics Through Chemistry*, III, pp. 617–621 (1988).

*Primary Examiner*—C. Melissa Bonner

*Attorney, Agent, or Firm*—Gary L. Griswold; Walter N. Kirn; David G. Burleson

[57] ABSTRACT

Improved silicone-free, continuous zirconia fibers have diameters greater than 5 micrometers and high tensile strengths. In another aspect, strong, flexible, zirconia fibers are prepared in a process involving the addition of colloidal $ZrO_2$ particles to a fiber precursor solution.

20 Claims, No Drawings

ZIRCONIUM OXIDE FIBERS AND PROCESS FOR THEIR PREPARATION

Matter enclosed in heavy brackets [ ] appears in the original patent but forms no part of this reissue specification; matter printed in italics indicates the additions made by reissue.

FIELD OF THE INVENTION

This invention discloses improved $ZrO_2$ fibers and a process for their preparation. The fibers are useful in refractory, reinforcement, and materials processing applications, and in energy production, filtration and in immobilization applications.

BACKGROUND OF THE INVENTION

Zirconium oxide or zirconia is a widely used ceramic material. The high melting point (about 2600° C.) and low thermal conductivity of zirconia make it attractive for refractory applications. When heated, zirconia displays a high diffusivity of oxygen which has led to its use in sensors which monitor the oxygen content of, for example, combustion gases. When small amounts of other metal oxides are alloyed with zirconia, stabilized zirconias can be prepared which possess extremely high fracture toughness. The preparation and properties of these stabilized zirconias are the subject of much research which has led to the use of zirconia in wear and structural applications. In addition, zirconia surfaces have been found to be catalytic for many chemical reactions and, therefore, its use as a catalyst or catalyst support is well known. It is particularly advantageous for many applications to have the fibrous material be in the form of continuous fibers.

The preparation of continuous oxide fibers by the dry spinning of concentrated metal oxide precursors is well known. By continuous is meant greater than 1.0 meter in length. The viscous, fiberizable dope comprising a metal oxide precursor and solvent, usually water or an alcohol, is extruded through an orifice under pressure and drawn, typically on a rotating take-up wheel. By dope is meant the viscous mass from which the fibers are formed by spinning, extrusion, drawing or blowing processes. The resulting fibers are referred to as "green" fibers. By "green" is meant unfired. The green fibers are subsequently heated to an elevated temperature to volatilize and remove fugitive species and to form the fired ceramic fiber. In commercial production of such fibers the mass throughput is an important economic consideration. The diameter of the fiber strongly affects the mass throughput at a give spinning rate and therefore the cost per given mass of fiber. For example, for a given fiber length a 10 micrometer diameter fiber has 4 times the mass of a 5 micrometer diameter fiber. Therefore, for equal spinning rates (m/min.) a fiber line producing a 10 micrometer diameter fiber will have 4 times the mass output of a fiber line preparing a 5 micrometer diameter fiber. A further advantage of larger diameter fibers is their smaller exterior surface area to volume ratio. Under conditions in which the surrounding environment reacts with the fiber, a larger diameter fiber will be more slowly attacked than a smaller diameter fiber. As the diameter of ceramic fibers increases, it becomes increasingly difficult to maintain a high specific strength. This is due to the statistical nature of brittle fracture. In addition, it is increasingly difficult to maintain a crack-free microstructure as fiber diameter increases. This is due to the increasing difficulty of both removing gases generated during pyrolysis and accommodating the shrinkage accompanying pyrolysis and sintering, and the consequent greater flaw frequency with increasing fiber diameter. In general, the specific strength of ceramic fibers decreases with increasing diameter to a greater extent than would be predicted by strictly statistical considerations which assume a constant microstructure.

A number of processes, for the preparation of $ZrO_2$ based fibers are known. One method is the "relic process" as described in U.S. Pat. Nos. 3,385,915 and 3,860,529. In the "relic process" the zirconium compound and compounds of any desired stabilizing oxides are impregnated into an organic polymeric fabric or textile. The impregnated fabric or textile is then heated in an oxidizing atmosphere. Fibers produced by this process, however, do not posses sufficient mechanical strength or flexibility for many applications.

Other processes for preparing $ZrO_2$ based fibers have also used solutions of zirconium compounds such as salts or alkoxides as zirconium sources. Such processes are described in U.K. Patent Nos. 1,030,232 and 1,360,197; U.S. Pat. Nos. 3,180,741; 3,322,865; and 3,992,498. "Green" fibers are formed by spinning, drawing, blowing or extrusion. The green fibers are fired to volatilize and remove fugitives (i.e., water, organics, and anions such as chloride or nitrate) from the fiber and to form zirconium oxide. In these processes a solution of soluble zirconium salts, additives, and modifiers is concentrated, typically by warming under a reduced pressure in a rotary evaporator to produce a highly viscous fiberizable dope. During concentration of the solution to form the dope, the zirconium salts sad possibly any additive metal salts may undergo hydrolysis or polymerization reactions to form hydrolyzed or polymerized species. These zirconium species may be of colloidal size and are referred to as sol particles. The nature of the sol particles which are formed "in-situ" in the dope are a function of a number of process variables including the anions present, the temperature, the pH, the rate and extent of concentration, and the presence of other species. The size and nature of these "in-situ" generated sol particles are therefore difficult to control and characterize, and may change with time. The fiber precursors in these processes may thus not be true solutions in that in addition to soluble species they may also contain hydrolyzed or polymerized species of colloidal size.

While it is difficult to generalize because of the number of variables involved, the colloidal particles formed "in-situ" by these processes are amorphous or poorly crystalline species. Regardless of the nature of such colloidal species, the precursor will still contain the bulk of the anions and ligands present from the metal salts prior to concentration. The presence of large quantities of these anions and ligands complicates the firing of the green fibers. In fact, the limitations on these disclosed processes in which the colloidal $ZrO_2$ species are generated "in-situ" are apparent in the prior art.

Winter et al., (U.S. Pat. No. 3,846,527) disclose a process for the preparation of inorganic fibers by dry spinning a solution, sol or dispersion of one or more metal compounds. The ability to use sols and dispersions of a variety of particles from 5 micrometers to hundreds of angstrom in diameter is discussed. This patent, however, does not disclose fibers of improved properties. Fibers prepared according to the teachings of this patent possess relatively low strengths as disclosed in the examples.

Nowhere does the prior art describe the preparation of strong, flexible, continuous $ZrO_2$ fibers of greater than about 5 micrometers in diameter. In fact, several unsuccessful attempts to prepare such fibers have been recently described in the literature. Recently published work by Marshall et al., J. Am. Ceram. Soc. 70[8]C-187– C188(1987) on zirconia based fibers prepared from a zirconium acetate based dope indicates that zirconia fibers with high strengths (1.5–2.6 GPa) can be prepared, but only if the fiber diameter is small (less than 5 micrometers). In a subsequent report fibers of up to 12 micrometers in diameter were prepared; however, these fibers broke into smaller fibers during pyrolysis. This study suggested that low density regions produced in the fibers during pyrolysis were the source of the major flaws. See M. E. Khavari, F. F. Lange, P. Smith, and D. B. Marshall, "Continuous Spinning of Zirconia Fibers: Relations Between Processing and Strength" Proceedings of the Materials Research Society; Better Ceramics through Chemistry III, pp. 617–621 (Edited by C. J. Brinker, D. E. Clark, and D. R. Ulrich, Materials Research Society, Pittsburgh, Pa. (Fall, 1988)). The value that such improved fibers would have in a variety of applications such as reinforcement, filtration, and catalysis is evident to those familiar with the art.

SUMMARY OF THE INVENTION

Briefly, the present invention provides a silicon-free, green fiber comprising crystalline colloidal zirconia particles having diameters in the range of 5 to 200 nm, at least one water soluble zirconium compound, and solvent.

We have found, surprisingly, that controlled incorporation of crystalline colloidal $ZrO_2$ particles into solutions of soluble zirconium compounds yields upon concentration a dope which allows the preparation of strong, flexible, continuous, fired fibers with larger diameters (i.e., in the range of 5–50 micrometers) than previously achievable. The colloidal $ZrO_2$ particles used in the practice of the present invention are of a more condensed nature (higher density) than the hydrolyzed or polymerized in situ zirconium salts previously taught. The more condensed, crystalline nature of these particles is believed to result in less shrinkage during firing of the fibers and is believed to be important in the preparation of strong, continuous large diameter fired fibers. In preferred embodiments of this invention these crystalline colloidal $ZrO_2$ particles comprise the major source of $ZrO_2$ in the fibers.

The present invention discloses a continuous silicon-free, carbon-free, zirconia fiber having a diameter grater than 5 micrometers, preferably in the range of 8 to 25 micrometers and having a tensile strength greater than 0.5 GPa, preferably in the range of 1.0 to 5.0 GPa, and most preferably greater than 2.0 GPa.

In another aspect, a process for the preparation of strong, flexible, zirconium oxide based fibers of diameters from 0.5 to 50 micrometers is also disclosed. The fibers may be either continuous or discontinuous in form and may possess either high surface area (in the range of 1 to 200 $m^2/g$) or low surface are (less than 1 $m^2/g$) depending on the processing conditions employed. The process for their preparation involves incorporation of crystalline colloidal $ZrO_2$ particles into the fiber precursor also containing a soluble zirconium compound and a solvent. The presence of these colloidal particles allows strong, continuous fibers with larger diameters than previously achievable to be prepared.

As used in the present application, "zirconia fibers" means fibers consisting of crystalline zirconia which may also contain other metal oxides as phase change stabilizers, grain growth inhibitors, or catalytic materials. By silicon-free is meant not containing silicon other than as an impurity at a level of less than about 2 weight percent.

Detailed Description and Specification of the Invention

The present invention provides, in a preferred embodiment, zirconia fibers and a method for preparing a ceramic fiber comprising crystalline zirconia grains having a grain size of at most 1.0 micrometer, the fiber having a diameter in the range of 5 to 50 micrometers and a tensile strength greater than 0.5 GPa.

The method of preparing these fibers involves spinning, drawing, blowing, or extruding green fibers from dopes which contain both crystalline colloidal $ZrO_2$ particles, soluble zirconium compounds and a solvent. For the preparation of continuous fibers a dry spinning process in which the dope is extruded through a spinneret and drawn in air is preferred. The dry spinning process is well known in the art as is taught in, for example, "Man-made Fibers", Science and Technology, Vol. 1, editors H. F. Mark, S. M. Atlas, E. Cernia (Interscience Publ. 1967) p. 145ff. Prior to firing, the green fiber of the present invention comprises a mixture of crystalline $ZrO_2$ particles, the zirconium compound, and solvent which preferably is water. The green fibers are characterized by a generallY round cross-section and sufficient mechanical strength to be readily handled. The fibers are either transparent or translucent, depending upon the concentration and size of the crystalline $ZrO_2$ colloidal species present. In addition, soluble compounds or sols of other metals such as yttrium, calcium, magnesium, cerium, aluminum, etc., these oxides being known to stabilize $ZrO_2$ in a particular crystal form or to inhibit grain growth during firing may also be present in the dope. Catalytic materials or their precursors may also be present. Such catalytic materials can include metals such as chromium, cobalt, copper, iron, nickel, palladium, platinum, vanadium, etc. and their oxides. Precursors of these can include the respective soluble salts or sols of the metals or their oxides. In addition soluble organic polymers such as polyethyleneglycol, polyethylene oxide, polyvinylacetate, polyvinylalcohol, polyvinylpyrrolidone, etc., which can serve as thickeners or fiberizing aids may also be present in the dope. These organic polymers are removed by decomposition and volatilization of volatile species formed during the firing process. Firing of the fibers can be accomplished by gradually raising their temperature in an oxygen containing atmosphere to decompose the zirconium compound and generate zirconium oxide.

Colloidal sols typically contain a distribution of particle sizes which may be multimodal in character. Nyacol, Inc. (Ashland, Mass) manufactures a series of aqueous $ZrO_2$ sols, for example, which contain a distribution of colloid sizes. Nyacol™ Zr 100/20, for example, is a crystalline, colloidal $ZrO_2$ sol with a stated particle size of 100 nm which according to the manufacturer contains $ZrO_2$ particles which range from approximately 100 to 5 nm in size. Similarly, Nyacol™ Zr 50/20, Nyacol™ Zr 150/20, and Nyacol™ Zr 200/20 contain crystalline, colloidal $ZrO_2$ particles ranging in size from approximately 50 to 5 nm, 150 to 5 nm, and 200 to 5 nm, respectively. The percentage of the total sol particles present as the various sizes in the distribution may vary somewhat from lot to lot.

In the practice of the present invention it has been found that if colloidal particles of too large a size are incorporated in the dope, fibers with inferior properties may be produced. To prepare high quality fibers the colloidal $ZrO_2$ particles should be less than or equal to about 200 nm and preferably less than or equal to about 100 nm in size. Larger particles may be used in admixture with the smaller particles but it is preferred that particles less than about 200 nm constitute the majority (greater than 50 percent) by mass of the colloidal $ZrO_2$ particles. Colloidal particles need not be spherical and may be of an irregular or nonequiaxed shape. In the case of nonequiaxed particles the sizes referred to above are of the major axis present in the particle.

In the practice of this invention these colloids are crystalline in nature. By crystalline is meant capable of diffracting X-rays or electrons so as to produce a diffraction pattern characteristic of one of the crystalline phases of zirconium oxide. The monoclinic phase is the crystalline phase present in the Nyacol $ZrO_2$ sols used in the examples of the present invention. Procedures for preparing tetragonal and cubic phase crystalline $ZrO_2$ sols are also known and if of the proper size are also useful in the practice of the present invention. See "Physical and Chemical Aspects of Adsorbents and Catalysts" (Edited by B. G. Linsen, Academic Press, N.Y. (1970)). See also, U.S. Pat. No. 3,110,681. The colloidal particles need not be single crystal but can be and typically are polycrystalline in nature. Thus the average crystal size of the zirconia sol may be less than or equal to the average colloid size in the sol. From electron microscopic examination, the average crystal size of the Nyacol zirconia sols used in the examples of this invention is about 5 to 10 nm (50–100Å). The crystalline zirconia particles comprise 20 to 80 weight percent, preferably 50 to 80 weight percent of the total zirconia equivalents present in the dope.

Soluble zirconium compounds for use in the practice of this invention include both organic and inorganic salts such as the acetate, formate, chloride, nitrate, etc., or the corresponding oxysalts (i.e., zirconyl acetate) or basic salts. Such compounds are well known, and are commercially available. More than one soluble zirconium compound may also be used, alone or in admixture. The preferred soluble zirconium compound is zirconyl acetate. Soluble zirconium compounds comprise 20 to 80 weight percent, preferably 20 to 50 weight percent of the total zirconia equivalent present in the dope.

The preferred solvent for the preparation of the dope is water. Other solvents, particularly polar organic solvents such as alcohols, aldehydes, esters, ethers, and ketones may also be used alone or in admixture with water to prepare the fibers. For reasons of performance, safety, toxicity, and expense, water is the preferred solvent for preparation of fibers of the present invention.

Since hafnia is commonly associated in nature with zirconia, commercially available zirconia compounds, and aqueous solutions thereof, and zirconia sols normally will contain about 1 to 2 weight percent equivalent hafnia after calumniation to oxide. Therefore, hafnia will normally be present in the refractory product of this invention in a correspondingly small or trace amount in addition to other impurities which constitute less than 2 weight percent.

It can be desirable to include precursors of other metal oxides with the $ZrO_2$ sources to stable a particular crystalline phase of $ZrO_2$ or to retard grain growth in the fibers during firing or use at high temperatures. Salts or oxide sols of metals such as magnesium, calcium, aluminum and the like and salts or oxides of rare earth elements such as yttrium, cerium, and the like, all of which are commercially available, may be included at levels of from approximately 0–20 mol percent based on total moles of $ZrO_2$. The presence of these additives is important in preparing fibers which retain high strength when fired to high temperatures. These features of $ZrO_2$ are well known in the art and are discussed in, for example, R. H. Stevens, Zirconia and Zirconia Ceramics, published by Magnesium Elektron Ltd. (1986).

If the fibers are desired for a catalytic application, precursors for a catalytic metal or metal oxide may be included in the dope. Thus, transition metals such as nickel, iron, copper, chromium, cobalt, manganese, etc., or their metal oxides, noble metals such as palladium, platinum, etc., all of which are commercially available, may be incorporated into the fiber by incorporating the respective salts or sols of these metals or metal oxides into the dope in amounts not greater than 10 mole percent based on the total mole equivalents of zirconium oxide. Particularly useful sources include the nitrates, chlorides, acetates, formates, and other highly soluble salts. Green fibers may be spun from dopes containing these catalytic metal or metal oxide sources. When fired in an oxygen containing atmosphere, the fibers will generally, except in the case of noble metals, contain the catalytic metal as its oxide. In order to maintain a high surface area, fibers should not be fired above about 1100° C. In general, surface area is inversely related to firing temperature. If it is desired that the catalyst be present in its metallic form, after firing in an oxygen containing atmosphere, the fibers can be heated in a reducing atmosphere to effect reduction of the metal oxide to a metallic phase. Preferred reducing atmospheres are hydrogen containing atmospheres such as pure hydrogen, hydrogen-nitrogen and hydrogen-argon mixtures. The conditions necessary to effect reduction are dependent on the particular metal oxide being reduced.

An alternative method of incorporating phase stabilizers, grain growth inhibitors, or catalytic species on and in the fiber can be to soak the fired fiber in a solution or sol of the desired additive species or a source of it. The concentration of the solution or sol may vary depending on the amount of stabilizers, inhibitors, or catalytic species desired in the fired fiber. If necessary, the infiltrated fiber can then be treated to decompose the source and form the desired species. It is also possible to deposit materials on and within the fibers by vapor phase techniques such as chemical vapor deposition and physical vapor deposition. By these processes it is possible to modify the fibers to enhance their utility as catalysts, filtration media, chromatographic media, refractory media, etc.

It may also be desirable to have a soluble organic polymer present in the dope to aid in fiberization. Polymer concentrations of 0 to 50 weight percent, preferably 20–40 weight percent of the total $ZrO_2$ equivalent weight content may be used. Among polymers which are useful in the practice of this invention are polyethyleneglycol, polyethylene oxide, polyvinylacetate, polyvinylalcohol, and polyvinylpyrrolidone, all of which are commerically available. The preferred fiberizing aid is polyvinylpyrrolidone (PVP).

In the preferred embodiment of this invention, the crystalline $ZrO_2$ particles of colloidal size comprise the major $ZrO_2$ source (greater than 50 percent) and are mixed with the soluble ingredients discussed above in an aqueous medium to form the precursor mixture. The precursor mixture is then concentrated by removing water, for example, by warming the mixture under a reduced pressure in a rotary evaporator. The precursor mixture is concentrated until it attains the proper viscosity and rheology to permit fiberization by methods well known to those skilled in the art. This concentrated precursor mixture constitutes the dope. For the preparation of continuous fibers, it is preferred to dry spin the fibers by extrusion and drawing through an orifice or spinneret. The viscosity of the dope for dry spinning is preferrably 60 to 120 PaSec. Discontinuous or short fibers may be prepared by a blowing process as described in for example, U.K. Patent No. 1,360,197 and in the U.S. Pat. No. 3,795,524. In this process the dope is extruded through orifices from a stationary or rotating head and blown by parallel, oblique, or tangential streams of air, the resulting blown green fibers being in staple or short form with lengths generally less than 25 cm. These fibers my be collected on a screen in the form of a mat. Lower viscosity dopes may be used for the blowing process. Preferred viscosities for the blowing process are 1 to 100 PaSec. The green fibers are then fired by gradually raising their temperature in a furnace. Firing conditions may be critical if continuous high strength fibers are desired.

It is preferred that the firing rate not exceed 10° C./min until a temperature of about 500° C. is attained. Once the fibers have been fired to 500° C., they may be very rapidly heated (i.e. 100° C./min) to higher temperatures without being degraded. The fibers, when fired to less than about 1100° C. contain open porosity and consequently a high surface area. They are most useful for catalysis and absorbent applications. As the fibers are fired to higher temperatures (1100° C.–1400° C.), their porosity and surface area decreases and the fibers possess higher tensile strengths and elastic moduli. Fibers fired to these temperatures are most useful for structural and reinforcement applications. Fibers fired to still higher temperatures (1400° C. and above) may become brittle and less strong due to grain growth within the fiber. The presence of grain growth inhibition such as aluminum oxide is advantageous in reducing this grain growth and the consequent reduction in mechanical properties. The upper limit of temperature to which the fibers can be exposed and still retain useful mechanical properties is also dependent on the length of exposure. Exposures up to about the melting point of zirconia (about 2600° C.) may be tolerated if the exposure time is short or if retention of mechanical strength after exposure is not important. For most applications, it is preferred that the fibers be fired to a temperature range of 400° to 2000° C. in an oxygen-containing atmosphere.

The incorporation of crystalline $ZrO_2$ particles of colloidal size into the dope results in green fibers possessing a crystalline $ZrO_2$ phase dispersed in an amorphous matrix comprising zirconium compounds, a solvent and optionally organic polymers and precursors of phase change stabilizers, grain growth inhibitors, and catalytic materials. It is believed that these finely dispersed crystalline $ZrO_2$ particles reduce the generation of flaws during firing by reducing the shrinkage of the green fiber and providing a microstructure from which gases can more easily escape during firing.

The firing process results in the decomposition and volatilization of organic polymers and solvent present in the green fiber. In addition, soluble zirconium compounds and precursors of phase change stabilizers, grain growth inhibitors and catalytic materials are converted into their respective oxide or metallic state.

The fired fibers possess a microstructure consisting of crystalline grains of zirconia in which the size of the individual crystalline grains is less than 1.0 micrometer in largest dimension. The zirconia grains may contain other metal oxides in solid solution as phase change stabilizers or grain growth inhibitors. The microstructure may contain additional crystalline phases as grain growth inhibitors such as aluminum oxide or as catalytic materials. These additional crystalline phases are also less than 1 micrometer in largest dimension. The crystalline grain size of both the zirconia grains and any additional phases is a function of the firing temperature. The grain size increases with increasing firing temperature. Fibers fired at temperatures at or below 1400° C. typically possess grain sizes less than 0.5 micometers in largest dimension. The resulting fired microstructures of the present invention possess smaller, less faceted grains, and fewer regions of low density than fibers prepared by the teaching of the background art.

The fibers are useful in structural, catalytic, refractory, separation, filtration, immobilization, energy production, and material processing applications. In particular, because of their high strength, these fibers are useful as reinforcing fibers in composites. The composite matrix may be a polymer, a ceramic or a metal. The fibers in a woven or matted form are useful as a filtration medium especially in cases where extremely corrosive environments are encountered, for example, in liquid filtration at extreme pHs. The fibers are also useful in catalyst applications either as a support for catalysts such as finely divided metal or metal oxide particles or as the catalyst itself. Fibers which possess a high surface area are preferred for catalytic applications. Applications of zirconium oxide based spherules in separation and immobilization are disclosed in Applicant's copending patent application, U.S. Ser. No. 07/151,819, filed 2/3/88. The fibers of the present invention are also useful in these applications, particularly those with high surface areas. Because of their strength and flexibility the fibers of the present invention are useful for high temperature environments such as required in refractory, energy production, and material processing applications.

Objects and advantages of this invention are further illustrated by the following examples, but the particular materials and amounts thereof recited in these examples, as well as other conditions and details, should not be construed to unduly limit this invention.

Testing Methods

The surface areas of the fibers were determined by the Brunauer-Emmett-Teller (BET) nitrogen adsorption technique using a Quantasorb™, Model SW-6 surface area measuring instrument (commercially available from Quantachrome Corp., Syosset, New York).

Tensile strength data were obtained by the application of load on a single filament. For most measurements a gauge length of 12.8 mm was used. For some measurements of weaker fibers a 6.4 mm gauge length was used. A uniform loading rate of 120 g per minute was used. To enable the calculation of tensile strength, filament diameters were measured directly using a micrometer.

Modulus of elasticity data were obtained on single fibers using a vibration resonance technique. A short (1 to 2 cm) length of fiber was glued onto a metal substrate attached to an accoustical driver so that it was cantilevered out from the substrate perpendicular to the direction of vibration. When the accoustical driver was oscillated, the fiber had several distinct and unique frequencies of resonance, the patterns of which were observed with a binocular microscope. The dynamic elastic modulus of the fiber was calculated according to the following equation:

$$E=64\ ^2p(LF/dk)^2$$

where E=elastic modulus, L=fiber length, d=fiber diameter, F=resonant frequency, k=mode coefficient, and p=fiber density.

For calculation of elastic modulus, the fiber density was assumed to be 6.1 g/cm$^3$. The viscosities recited are Brookfield viscosities measured at ambient room temperature. In describing a fiber as "transparent", this term means that the fiber when viewed under an optical microscope, e.g., with a stereoscopic microscope at 50× and oblique or transmitted light, has the property of transmitting rays of visible light. Thus, bodies beneath and contiguous with the transparent fiber, such as fibers of the same nature, can be clearly seen therethrough, the outline, periphery or edges of contiguous bodies beneath being sharply discernible. "Opaque" fibers, on the other hand, as referred to herein are those which are impervious to visible light, i.e., contiguous bodies beneath are obscured by opaque fibers and cannot be seen therethrough. "Translucent" fibers are those whose ability to transmit light falls between transparent and opaque, and although translucent fibers have the property of transmitting visible light to some degree, and therefore are somewhat or partially transparent, contiguous bodies beneath can be seen in a diffuse manner rather than in a clearly distinguishable or sharp manner.

Sometimes, because of vagaries in firing, a fiber product may be a mixture of these various types of fibers (viz., transparent, opaque, translucent) though generally one type will be present in a predominant amount, indicative of the true nature of the mixture, the other types of products present in minor amounts having their particular appearance due to incomplete firing at the desired temperature or due to overheating because of hot spots in the furnace.

The practice of the present invention is illustrated by, but not limited to the following examples. The beneficial effects of the presence of crystalline $ZrO_2$ sol particles on the preparation of large diameter (greater than or equal to 5 micrometers), continuous, fired fibers is demonstrated by Examples 1 and 2.

The zirconia fibers prepared in these examples contain 2.5 mole percent $Y_2O_3$ and 97.5 mole percent $ZrO_2$.

EXAMPLE1

To 24.65g of aqueous zirconyl acetate (25 weight percent $ZrO_2$ equivalent) purchased from Harshaw Inc., Cleveland, Ohio, was added 1.92 g of yttrium nitrate hexahydrate. This was allowed to dissolve with stirring. Then 8.0 g of a 50 weight percent aqueous solution of a polyvinylpyrrolidone polymer (PVP K-30, manufactured by GAF, Inc. of New York, New York) was added. To this mixture, 29.27 g of Nyacol Zr 100/20, a nitrate stabilized, crystalline, colloidal $ZrO_2$ sol supplied at pH 3 with a stated particle size of about 100 nm containing 20 weight percent $ZrO_2$ manufactured by Nyacol Inc., Ashland, MA was added. The resulting mixture in which 49 weight percent equivalent of the $ZrO_2$ was present as the crystalline colloidal particles and 51 percent as the acetate was suction filtered through a #54 Whatman filter paper and concentrated in a rotary evaporator until a viscosity of about 80–90 PaSec was obtained. This concentrated, milky white dope was left overnight and extruded the following day through a 75 micrometer, 40 hole, spinneret using a $N_2$ pressure of about 1.5 mPa. Fibers were drawn onto a takeup wheel at about 25 m/min. The resulting continuous green fibers were of good quality, transparent, and strong.

The green fibers were draped over an aluminum oxide rod and suspended in a resistively heated programmable furnace. The temperature was raised from ambient to 900° C. over 12 hours and then held at 900° C. for two hours. The furnace was then allowed to cool back to room temperature. The fired fibers were continuous, translucent, glossy and strong and ranged from 9–25 micrometers in diameter. The average tensile strength of these fibers was 1.25 GPa. X-ray diffraction analysis showed the fiber to have a tetragonal crystal structure.

Comparative Example 2

To 48.06g of zirconyl acetate (25 weight percent equivalent $ZrO_2$) was added 1.92 g of yttrium nitrate hexahydrate. When dissolved, 8.0g of a 50 weight percent aqueous solution of PVP K-30 was added. This solution containing all of the equivalent $ZrO_2$ as the acetate was filtered and concentrated as above. The viscous water clear, dope obtained was left overnight and fibers were extruded and drawn as in Example 1 above. The resulting continuous green fibers were of good quality, transparent, and strong.

The green fibers were fired in an identical manner to those of Example 1. The fired fibers were opaque, dull, very friable and weak. These fibers were from 9 to 25 micrometers in diameter and badly cracked and broken. The fibers were too weak to allow measurement of tensile strength. X-ray diffraction analysis indicated that the samples had a tetragonal crystal structure.

Example 3 shows the influence of firing temperature on fiber properties.

EXAMPLE 3

The fibers prepared in this example contain 3.8 mole percent $Y_2O_3$ and 96.2 mole percent $ZrO_2$.

To 68.0g of 50 weight percent aqueous solution of PVP K-30 was added 23.8 g of yttrium nitrate hexahydrate dissolved in 50.0 g of deionized water. This solution was then added to a mixture of 292.7 g Nyacol Zr 100/20 colloidal $ZrO_2$ sol and 150.0 g of zirconyl acetate solution (25 weight percent equivalent $ZrO_2$). The resulting mixture in which 61.0 weight percent of the equivalent $ZrO_2$ is present as the crystalline colloidal particles and 39 percent as the acetate was filtered through a 0.3 micrometer Balston™ AA Grade cartridge filter available from Balston Filter Products, Lexington, Mass. The mixture was then concentrated on a rotary evaporator to a viscosity of about 90 PaSec. This dope was stored for 3 days at room temperature. Continuous, green fibers were then extruded through a 75 micrometer, 40 hole spinneret, using about 1.5 MPa of nitrogen pressure. The fibers were drawn onto a takeup wheel at about 25 m/min. The continuous green fibers were translucent and strong. They were stored in a drying oven at 70°–80° C. by hanging over a ceramic rod. These were saved for a firing study.

Fibers were divided into small bundles and were then heat treated to final temperatures of 800°, 900°, 1000°, 1100°, 1200°, 1300° and 1400° C., respectively and held for 2 hours. The fired fibers ranged in diameter from 9 to 25 micrometers and had tetragonal crystal structures. The properties of these continuous fibers were characterized as listed in Table 1.

TABLE 1

| Sample | Firing temp. (°C.) | Surface area ($m^2/g$) | Average tensile strength (GPa) | Elastic modulus (Gpa) |
|---|---|---|---|---|
| A | 800 | 23.9 | 1.19 | |
| B | 900 | 11.2 | 1.40 | 170 |
| C | 1000 | 1.2 | 1.45 | 181 |

TABLE 1-continued

| Sample | Firing temp. (°C.) | Surface area ($m^2/g$) | Average tensile strength (GPa) | Elastic modulus (Gpa) |
|---|---|---|---|---|
| D | 1100 | 0.3 | 1.52 | 219 |
| E | 1200 | 0.1 | 1.57 | 211 |
| F | 1300 | — | 1.49 | 231 |
| G | 1400 | — | weak | 231 |

Tale 1 shows the effect of firing temperature on the properties of the fibers prepared in Example 3. With increasing firing temperature (300°–1200° C.) the surface area of the fibers decreased and the tensile strength and elastic modulus increased. At higher firing temperatures (1300° C. and above) the fiber strength decreased.

The following examples, 4–7, illustrate the use of crystalline $ZrO_2$ colloids of different maximum particle size in the preparation of fibers containing 4.0 mole percent $Y_2O_3$ as a stabilizer. All of these colloidal $ZrO_2$ sols were purchased from Nyacol Inc., and, according to the manufacturer contain a distribution of particle sizes from the stated size down to about 5 nm.

In Examples 4–7, about 61 weight percent of the $ZrO_2$ in the fibers was from the crystalline colloids and the other 39 weight percent of the $ZrO_2$ was from zirconyl acetate.

EXAMPLE 4

12.5 g of yttrium nitrate hexahydrate was dissolved in 30 ml of deionized water. This was then added to 34.0 g of a 50 weight percent aqueous solution of PVP-K30. This solution was then added with good stirring to a mixture of 146.4g of Nyacol Zr 50/20 a colloidal $ZrO_2$ (20 weight percent $ZrO_2$) with a pH of 3 and a stated particle size of approximately 50 nm and 75.0 g of a zirconyl acetate solution (25 weight percent equivalent $ZrO_2$). The resulting mixture was pressure filtered through a 0.3 micrometers Balston AA grade cartridge filter (Balston Filter Products, Lexington, Mass.) under a pressure of about 120 KPa. The filtered mixture was concentrated on a rotary evaporator until a viscosity of about 100 PaSec was obtained. This dope was extruded under about 1.5 MPa $N_2$ pressure through a spinneret having 40 holes of 75 micrometers diameter. Fibers were drawn down onto a take up wheel about 2 meters below the spinneret at about 25 m/min. Heating lamps were mounted along the falling path of the fibers to assist in drying. The fibers spun very well and the continuous green fibers obtained were glossy, transparent and strong. Fibers obtained were either heat treated immediately after drying or stored in a 70°–80° C. drying oven for later firing.

Fibers were fired by draping over a ceramic rod and heating by the following schedule: room temperature to 300° C. over 10 hours, soak at 300° C. for 5 hours, 300° to 400° C. over 2 hours, soak at 400° C. for 2 hours, 400° C. to 500° C. over 2 hours, soak at 500° C. for 2 hours, 500° C. to 800° C. over 5 hours, soak at 800° C. for 2 hours, and cool to room temperature. At a later time the fibers were heat treated at 1100° C. for 2 hours and cooled to room temperature.

EXAMPLE 5

The same weights and material used in Example 4 were used to prepare fibers, however, Nyacol Zr 100/20, a $ZrO_2$ sol with a stated particle size of about 100 nm (20 weight percent $ZrO_2$) was used in place of the Nyacol Zr 50/20. The fibers spun well and glossy, translucent, strong continuous green fibers were obtained. The green fibers were fired in the same manner as described in Example 4.

EXAMPLE 6

The same weights and materials used in Example 4 were used to prepare fibers, however, Nyacol Zr 150/20, a $ZrO_2$ sol with a stated particle size of about 150 nm (20 weight percent $ZrO_2$) and a pH of 3 was used in place of the Nyacol 50/20. The fibers spun well and glossy, translucent, strong, continuous green, fibers were obtained. The green fibers were fired in the same manner as described in Example 4.

EXAMPLE 7

The same weights and materials used in Example 4 were used to prepare fibers, however, Nyacol Zr 200/20, a $ZrO_2$ sol with a stated particle size of about 200 nm (20 weight percent $ZrO_2$) and a pH of 3 was used in place of Nyacol Zr 50/20. Fibers were spun and the resulting continuous green fibers were glossy, milky, and handleable. These were fired as described in Example 4. These fired fibers were weak and somewhat friable.

The fired fibers prepared as described in Examples 4–7 were from about 9 to 25 micrometers in diameter, continuous, and had a cubic crystal structure. The average tensile strength of these fibers are shown in Table 2 below.

TABLE 2

| Example # | Maximum Colloid Size (nm) | Average Tensile Strength (GPa) |
|---|---|---|
| 4 | 50 | 1.44 |
| 5 | 100 | 1.57 |
| 6 | 150 | 1.20 |
| 7 | 200 | weak |

TABLE 2 shows that the avenge tensile strength of fibers prepared with colloids larger than 100 nm were less than those in which all of the colloidal particles were less than or equal to about 100 nm.

Examples 8 and 9 illustrate the inclusion of metal oxides and metals in the fibers for catalytic applications.

EXAMPLE 8

To 300 g of Nyacol Zr 100/20 colloidal $ZrO_2$ (20 weight percent $ZrO_2$) was added 160 g of zirconyl acetate (25 percent weight percent equivalent $ZrO_2$). After this was mixed, a solution of 13.56 g of yttrium nitrate hexahydrate dissolved in 40 g of deionized water was added. After mixing 66 g of a PVP solution (50 weight percent PVP K-30) was added. This mixture was divided into two equal portions.

(A) To one of the portions, 3.88 g of nickel nitrate hexahydrate dissolved in 10 g of deionized water was added. This produced a final NiO concentration in the fired fiber of 3.0 mole percent.

(B) To the other portion, 1.53 g of cupric nitrate trihydrate dissolved in 10 g of deionized water was added. This produced a final CuO concentration in the fired fiber of 1.5 mole percent.

Samples A and B were concentrated on a rotary evaporator to approximately 100 PaSec. Fibers were extruded and drawn as described in example 4. All spun well and glossy, transparent, strong continuous fibers were obtained. These were heated to 800° C. according to the schedule described in example 4. After heat treatment the fibers were approximately 9–25 micrometers in diameter and the surface areas of the fibers were determined by $N_2$ adsorption (TABLE 3).

TABLE 3

| Sample | Surface area ($m^2/g$) | Description |
|---|---|---|
| A | 13.3 | Transparent, strong, light green-yellow in color |
| B | 7.9 | Transparent, strong, light green in color |

The data of TABLE 3 shows that porous, continuous, strong, $ZrO_2$ fibers containing catalytic metal oxides were prepared by the teachings of this invention.

EXAMPLE 9

Portions of the samples prepared as in Example 8 A and B were placed in aluminum oxide boats and fired to 900° C. in a hydrogen atmosphere and cooled to room temperature. The resulting fibers were strong and black indicating the presence of metallic nickel in sample A and of metallic copper in sample B. The surface area of sample A was 12.9 m2/g and that of sample B was 8.1 $m^2/g$ as measured by $N_2$ adsorption.

Examples 10–12 illustrate the preparation of high surface area continuous fibers for catalysis, adsorbent, membrane, and filtration applications.

EXAMPLE 10

The fibers of this example contain 2.5 mole percent $Y_2O_3$.

30.81 g of Nyacol Zr 10/20 colloidal $ZrO_2$ (20 weight percent $ZrO_2$) a colloidal $ZrO_2$ sol with a stated particle size of 5 to 10 nm, and 24.65 g of zirconyl acetate (25 weight percent equivalent $ZrO_2$) were mixed. 3.83 g of yttrium nitrate hexahydrate were added to this mixture and allowed to dissolve. To this mixture was added 16.0 g of PVP K-30 (50 weight percent aqueous solution) and 58.53 g of Nyacol Zr 100/20 colloidal $ZrO_2$ (20 weight percent $ZrO_2$). This mixture was filtered through a #54 Whatman filter and concentrated on a rotary evaporator to a viscosity of about 100 PaSec. Continuous fibers were extruded and drawn as described in Example 4. These fibers were heat treated to 400° C. The fibers were white, glossy and fairly strong. The diameter of the fibers was in the range of 9–25 micrometers. The fibers had a surface area of 129 $m^2/g$ as determined by $N_2$ adsorption.

EXAMPLE 11

The fibers of this example contain 3.2 mole percent $Y_2O_3$.

To 292.70 g of Nyacol Zr 100/20 colloidal $ZrO_2$ (20 weight percent equivalent $ZrO_2$) was added 246.5 g of zirconyl acetate (25 weight percent $ZrO_2$) and 25.0 g of yttrium nitrate hexahydrate. This mixture was concentrated on a rotary evaporator to about 100 PaSec. The resulting dope was stored for 2 days at room temperature. Continuous fibers were extruded and drawn under the conditions described in Example 4. The fibers spun well and were heat treated to 400° C. over a period of 10 hours and soaked for 2 hours at 400° C. The fibers are continuous, readily handleable, water white, transparent and in the range of 8 to 60 micrometers in diameter The surface area u measured by $N_2$ adsorption was 137.1 $m^2/g$.

EXAMPLE 12

The fibers of this example contain 4.0 mole percent $Y_2O_3$.

292.7 g of Nyacol Zr 100/20 colloidal $ZrO_2$ (20 weight percent $ZrO_2$), 150 g Zirconyl acetate (25 weight percent equivalent $ZrO_2$) and 70.0 g of PVP K-30 (50 percent aqueous solution) were mixed. To this mixture was added 25.0 g of yttrium nitrate hexahydrate dissolved in 60 ml of distilled water. This mixture was filtered through a #54 Whatman filter and concentrated on a rotary evaporator to a viscosity of about 100 PaSec. The resulting dope was left for 2 days and then extruded as described in example 4. The fibers spun well and were continuous, glossy, transparent, and strong. A sample of the fibers was heat treated according to the following schedule; room temperature to 300° C. over 10 hours, soak at 300° C. for 5 hours, heat to 400° C. over 6 hours, soak at 400° C. for 5 hours, heat to 600° C. over 5 hours, soak at 600° C. for 2 hours, and cool to room temperature. The fibers were colorless, transparent, glossy, and strong. The average tensile strength of fibers ranging from about 10 to 17 micrometers in diameter was 1.05 GPa. The surface area as measured by $N_2$ adsorption was 37.6 $m^2/g$.

Examples 13–14 illustrate the inclusion of $Al_2O_3$, a grain growth inhibitor, as well as, $Y_2O_3$ in the $ZrO_2$ fibers.

EXAMPLE 13

The fibers of this example contain 90.9 mole percent $ZrO_2$, 5.5 mole percent $Al_2O_3$, and 3.6 mole percent $Y_2O_3$.

29.27 g of Nyacol Zr 100/20 colloidal $ZrO_2$ (20 weight percent $ZrO_2$), 15.0 g zirconyl acetate (25 weight percent equivalent $ZrO_2$), 5.33 g of a solution of aluminum basic formoacetate containing 9 weight percent $Al_2O_3$, and 2.38 g of yttrium nitrate hexahydrate dissolved in 50 ml. of deionized water were mixed. The aluminum basic formoacetate was prepared by digesting aluminum metal in a solution containing an approximately equimolar mixture of formic and acetic acids as described in U.S. Pat. No. 3,957,598. The ratio of total carboxylate to aluminum was approximately 1.0. The mixture was filtered and concentrated, and fibers were extruded as described in Example 4. The fibers spun well and glossy, transparent, strong, continuous, green fibers were obtained Portions of this batch were heat treated to 1000° C. and 1100° C. At both treatment temperatures the fibers were strong and glossy. The average tensile strength of 1000° C. treated fibers was 1.12 GPa. The average tensile strength of fibers heat treated at 1100° C. was 1.27 GPa with some fibers having strengths to 2.39 GPa.

EXAMPLE 14

The fibers of this example contain 89.2 mole percent $ZrO_2$, 7.6 mole percent $Al_2O_3$, and 3.2 mole percent $Y_2O_3$.

30.0g of Nyacol Zr 100/20 colloidal $ZrO_2$ (20 weight percent equivalent $ZrO_2$) 16.0 g zirconyl acetate (25 weight percent $ZrO_2$), 7.78 g of aluminum formoacetate solution (9 weight percent equivalent $Al_2O_3$), and 2.26 g of yttrium nitrate hexahydrate were mixed. The resulting mixture was filtered and concentrated to a fiberizable viscosity (about 100 PaSec). Continuous fibers were extruded under the conditions described in Example 4. Fibers were fired according to the following schedule; room temperature to 300° C. over 4 hours, soak for 1 hour at 300° C., heat to 400° C. over 1 hour, soak for 1 hour at 400° C., heat to 550° C. over 2 hours, soak for 1 hour at 550° C., heat to 1000° C. over 3 hours, soak at 1000° C. for 1 hour, and then cooled back to room temperature. The fired fibers were glossy, slightly translucent and strong.

Example 15 describes the preparation of larger diameter $ZrO_2$ fibers.

EXAMPLE 15

The fibers of this example contain 2.2 mole percent $Y_2O_3$.

2.0 g of $Y_2O_3$ powder was dissolved in 40 ml of deionized water acidified with 5.0 g of concentrated nitric acid by warming to approximately 70° C. This was mixed with 144.0 g of Nyacol Zr 50/20 colloidal $ZrO_2$ sol (20 weight percent $ZrO_2$) with a pH of 3 and a stated particle size of 50 nm. To this mixture 76.8 g of zirconyl acetate (25 weight percent equivalent $ZrO_2$) was added with stirring. The resulting mixture was filtered through a 0.2 micrometers Balston AA Grade cartridge filter into a round bottom flask and concentrated on a rotary evaporator to a viscosity of approximately 100 PaSec. This dope was extruded through a 150 micrometers, 30 hole spinneret under 1.5 MPa pressure and drawn onto a take up wheel rotating at a speed of approximately 25 m/min. The relative humidity was approximately 60 percent during spinning. The green fibers were continuous, round, transparent, and strong and had diameters ranging from about 25 to 60 micrometers.

The green fibers were fired by draping them over an alumina rod in a programmable furnace. The fibers were heated to 800° C. according to the following schedule. Room temperature to 300° C. over 10 hours, hold at 300° C. for 5 hours, 300° C. to 400° C. over 5 hours, hold at 400° C. for 5 hours, 400° C. to 500° C. over 5 hours, hold at 500° C. for 2 hours, 500°–800° C. over 5 hours, and hold at 800° C. for 2 hours.

The 800° C. fired fibers were from 20 to 50 micrometers in diameter, continuous, transparent, and strong. The average tensile strength on measured fibers averaging 23 micrometers in diameter was 0.62 GPa.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A silicon-free green fiber comprising:

(a) crystalline colloidal zirconia particles with diameters in the range of 5 to 200 nm, (b) at least one water soluble zirconium compound, and (c) residual solvent.

2. The green fiber according to claim 1 wherein said crystalline colloidal zirconia particles comprise 20 to 80 weight percent of the total zirconia equivalent present in said fiber.

3. The green fiber according to claim 1 wherein said soluble zirconia compound comprises 20 to 80 weight percent of the total zirconia equivalent present in said fiber.

4. The green fiber according to claim 1 wherein said soluble zirconium compound is zirconyl acetate.

5. The green fiber according to claim 1 wherein said solvent is water.

6. The green fiber according to claim 1 further comprising at least one of:

(a) a water soluble compound or sol of metals whose oxides are phase change stabilizers for zirconium oxide wherein said metals comprise more than 0 and up to 20 mole percent of the total equivalent moles of zirconia present;

(b) at least one water soluble compound or sol of metals whose oxides are grain growth inhibitors for zirconium oxide and wherein said metals comprise more than 0 and up to 20 mole percent of the total equivalent moles of zirconia present;

(c) at least one water soluble catalyst or its precursor wherein said catalyst or precursor comprises more than 0 and up to 10 oxide equivalent mole percent of the total equivalent moles of zirconia present; and (d) a water soluble organic polymer wherein said polymer comprises more than 0 and up to 50 wt. percent of the total zirconia mass content of the fiber.

7. The green fiber according to claim 6 wherein said phase change stabilizer for zirconium oxide is a compound or sol of a metal selected from the group consisting of yttrium, magnesium, calcium, and cerium.

8. The green fiber according to claim 6 wherein said grain growth inhibitor is aluminum.

9. The green fiber according to claim 6 wherein said water soluble catalyst or its precursor is selected from the group consisting of chromium, cobalt, copper, iron, nickel, palladium, platinum and vanadium; their respective oxides, and their respective soluble salts or sols.

10. The green fiber according to claim 6 wherein said water soluble organic polymer is selected from the group consisting of polyethyleneglycol, polyethylene oxide, polyvinylacetate, polyvinylalcohol, and polyvinylpyrrolidone.

11. The green fiber according to claim 6 wherein said s organic polymer comprises 20 to 40 weight percent of the total zirconia content of said fiber.

[12. A ceramic fiber comprising crystalline zirconia grains having a grain size of at most 1.0 micrometer, said fiber having a diameter in the range of 10 to 60 micrometers and a tensile strength greater than 0.5 GPa.]

13. A yarn prepared from the fibers of claim [12] *21*.

14. A knitted fabric prepared from the fibers of claim 13.

15. A woven or non-woven fabric prepared from the fibers of claim [12] *21*.

16. A process of making a ceramic fiber containing crystalline zirconia grains comprising the steps of:

(a) mixing crystalline, colloidal zirconia particles, at least one soluble zirconia compound, and solvent;

(b) concentrating said mixture;

(c) extruding or blowing [said fiber to provide] a green fiber *from said mixture*; and (d) heating said green fiber to a temperature in the range of 400° to 2000° C. in an oxygen-containing atmosphere to provide said *ceramic* fiber [containing crystalline colloidal zirconia particles].

17. A process of making a ceramic fiber containing crystalline zirconia [particles] *grains* comprising the steps of:

(a) mixing crystalline, colloidal zirconia particles, at least one soluble zirconium compound, solvent, and at least one of:

(1) a water soluble compound or sol of metals whose oxides are phase change stabilizers for zirconium oxide wherein said metals comprise more than 0 and up to 20 mole percent of the total equivalent moles of zirconia present;

(2) at least one water soluble compound or sol of metals whose oxides are grain growth inhibitors for zirconium oxide and wherein said metals comprise more than 0 and up to 20 mole percent of the total equivalent moles of zirconia present;

(3) at least one water soluble catalyst or its precursor wherein said catalyst or precursor comprises more than 0 and up to 10 oxide equivalent mole percent of the total equivalent moles of zirconia present; and (4) a water soluble organic polymer wherein said polymer comprises more than 0 and up to 50 wt. percent of the total zirconia mass content of the fiber;

(b) concentrating said mixture;

(c) extruding or blowing [said fiber to provide] a green fiber *from said mixture*; and (d) heating said green fiber to a temperature in the range of 400° to 2000° C. in an oxygen-containing atmosphere to provide said ceramic fiber [containing crystalline colloidal zirconia particles].

18. The ceramic fiber according to claim 16 which is a continuous fiber made by the process having a length greater than 1 meter.

19. A continuous zirconia fiber prepared according to the process of claim 16, having a diameter in the range of 10 to 60 micrometers, and a tensile strength greater than 0.5 GPa.

20. The ceramic fiber according to claim [12] *21* having a diameter in the range of 17 to 60 micrometers.

*21. The fiber prepared according to the process of claim 16, said fiber having a diameter in the range of 10 to 60 micrometers and a tensile strength greater than 0.5 GPa, said zirconia grains having a grain size of at most 1.0 micrometer, said fiber comprising at least 89.2 mole percent zirconia.*

* * * * *

UNITED STATES PATENT AND TRADEMARK OFFICE

CERTIFICATE OF CORRECTION

PATENT NO.: Re. 35,143

DATED: January 9, 1996

INVENTOR(S): Eric F. Funkenbusch and Tai T. Tran

It is certified that error appears in the above-identified patent and that said Letters Patent is hereby corrected as shown below:

Col. 6, line 16 "calumniation" should read -- calcination --

Col. 14, line 42 "m2/g" should read -- $m^2/g$ --

Col. 15, line 16 "u" should read -- as --

Signed and Sealed this

Ninth Day of July, 1996

*Attest:*

*Attesting Officer*

BRUCE LEHMAN

*Commissioner of Patents and Trademarks*